United States Patent
Gelies

(10) Patent No.: US 7,784,354 B2
(45) Date of Patent: Aug. 31, 2010

(54) MOVEABLE WORKING DEVICE WITH SUPPORTING EXTENSION ARMS

(75) Inventor: Stephan Gelies, Magdeburg (DE)

(73) Assignee: Putzmeister Concrete Pumps GmbH, Aichtal (DE)

( * ) Notice: Subject to any disclaimer, the term of this patent is extended or adjusted under 35 U.S.C. 154(b) by 1071 days.

(21) Appl. No.: 10/576,838

(22) PCT Filed: Oct. 14, 2004

(86) PCT No.: PCT/EP2004/011523

§ 371 (c)(1), (2), (4) Date: Jul. 25, 2006

(87) PCT Pub. No.: WO2005/042319

PCT Pub. Date: May 12, 2005

(65) Prior Publication Data

US 2007/0090612 A1 Apr. 26, 2007

(30) Foreign Application Priority Data

Oct. 20, 2003 (DE) ................. 103 49 234

(51) Int. Cl.
*G01N 3/00* (2006.01)
(52) U.S. Cl. .......................... 73/788; 73/760
(58) Field of Classification Search .............. 73/760, 73/788

See application file for complete search history.

(56) References Cited

U.S. PATENT DOCUMENTS 3,586,841 A * 6/1971 Griffin .................. 702/43

(Continued)

FOREIGN PATENT DOCUMENTS

| DE | 78 07 036 U1 | 3/1979 |
|---|---|---|
| DE | 29 48 774 A1 | 6/1980 |
| DE | 85 08 519 U1 | 7/1985 |
| DE | 35 00 891 C1 | 6/1986 |
| DE | 197 30 436 A1 | 6/1998 |
| DE | 101 10 176 A1 | 9/2002 |

(Continued)

OTHER PUBLICATIONS

Grüger et al.: "Überwachungstechnik für Krane und Hubwerke," Hebezeuge und Fördermittel, 2002, pp. 432-434, vol. 42, No. 9, Berlin.

*Primary Examiner*—Max Noori
(74) *Attorney, Agent, or Firm*—Patent Central LLC; Stephan A. Pendorf

(57) ABSTRACT

The invention relates to a moveable working device, particularly an auto concrete pump, comprising an undercarriage (10) provided with two front and two rear supporting extension arms (22,24) which can be extended from a travel position into at least one support position, which can be supported on a foundation (36) and which are respectively provided with a supporting leg (28), also provided with a respective measuring member (38) for determining the support load acting upon the supporting legs (28). If the telescopic supporting legs (28) with the telescopic member (30) fixed to the extension arm are coupled to a support leg casing by means of a coupling bolt (32), it is possible to configure the coupling bolt as a measuring member (38) in order to determine the support load, using particularly simple means. The measuring members can be incorporated into a stability monitoring device comprising a computer-assisted evaluation electronics system (68,74). A software routine is provided for stability control in order to determine a stability figure (S) which is determined on the basis of the quotients of the overall sum of the support load measurement values of all supporting legs (28) and a partial sum of the support load measurement values of the two supporting legs (28) which are momentarily subjected to a support load. An alarm routine is also provided in order to trigger an alarm state if said values fall below a given stability threshold value (S1, S2, S3).

20 Claims, 5 Drawing Sheets

U.S. PATENT DOCUMENTS

| | | |
|---|---|---|
| 3,713,129 A | 1/1973 | Buchholz |
| 4,042,135 A * | 8/1977 | Pugh et al. .................. 414/718 |
| 4,688,690 A * | 8/1987 | Gattu et al. .................. 212/349 |
| 5,789,681 A * | 8/1998 | Angley et al. .................. 73/803 |
| 7,012,540 B2 * | 3/2006 | Petzold et al. .............. 340/679 |
| 2004/0119597 A1* | 6/2004 | Petzold et al. .............. 340/679 |
| 2008/0217279 A1* | 9/2008 | Gelies et al. ................ 212/278 |

FOREIGN PATENT DOCUMENTS

| | | |
|---|---|---|
| GB | 2 187 432 A | 9/1987 |
| JP | 04 070528 A | 3/1992 |
| JP | 2000 095074 A | 4/2000 |
| NL | 9 401 892 A | 6/1996 |
| WO | WO 02/075076 A2 | 9/2002 |

* cited by examiner

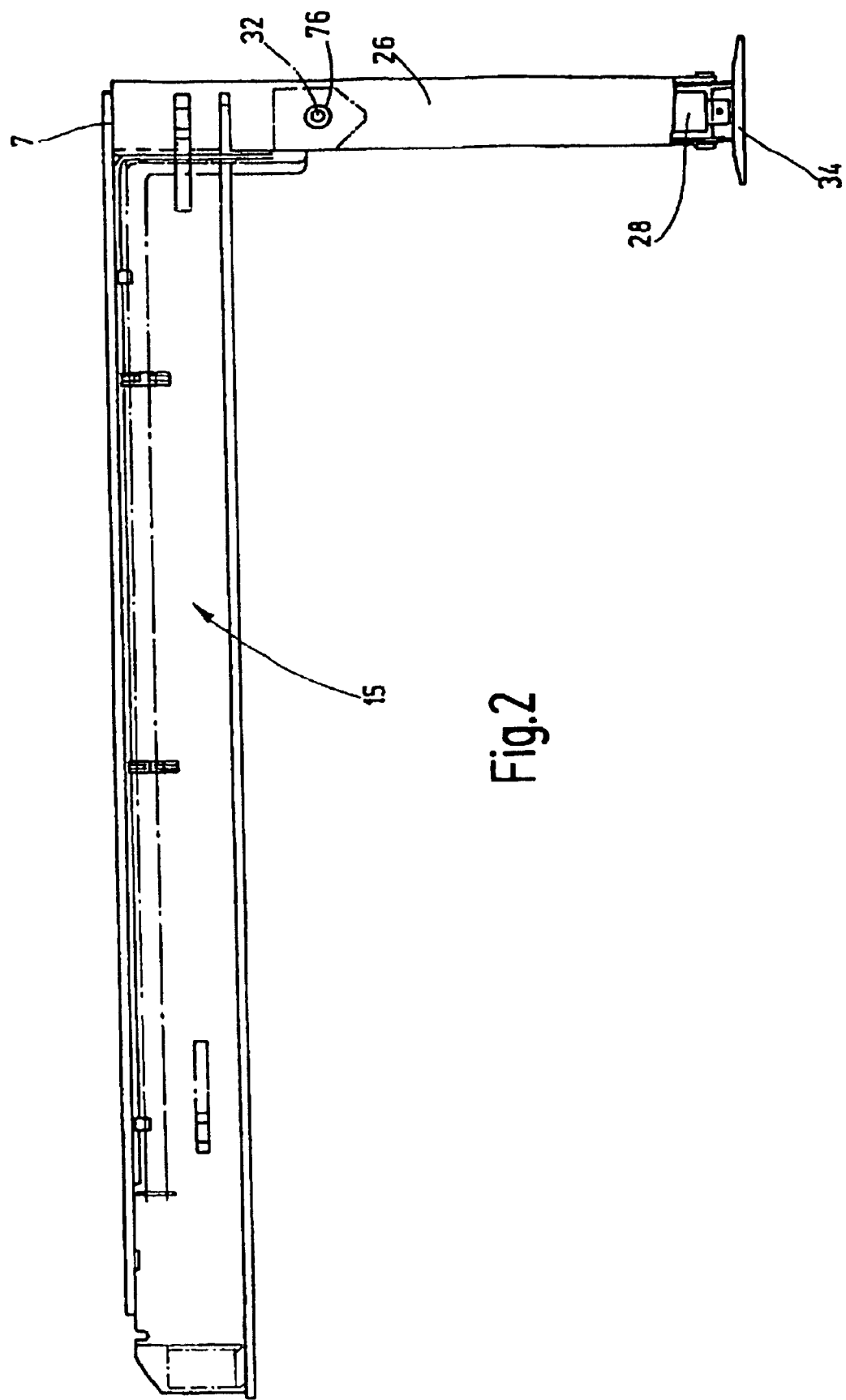

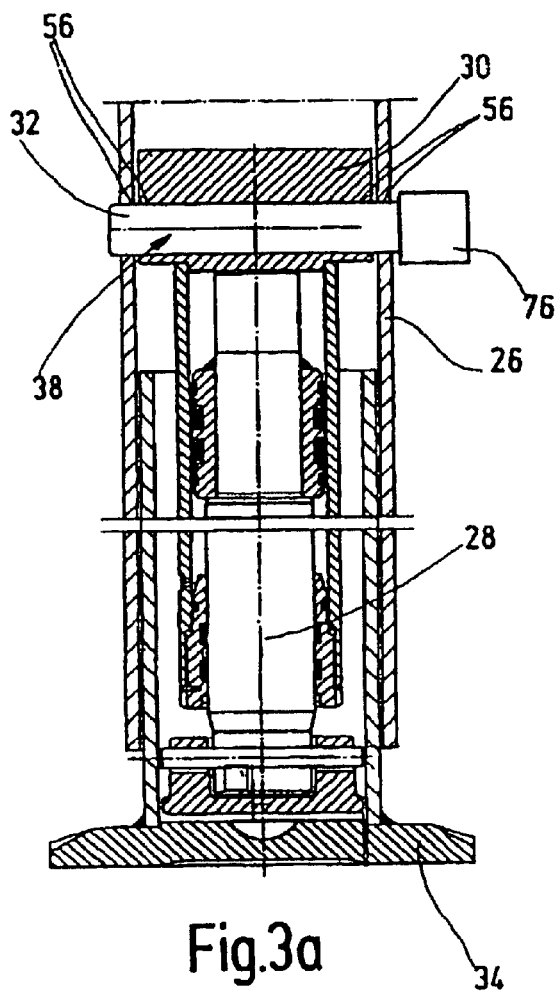
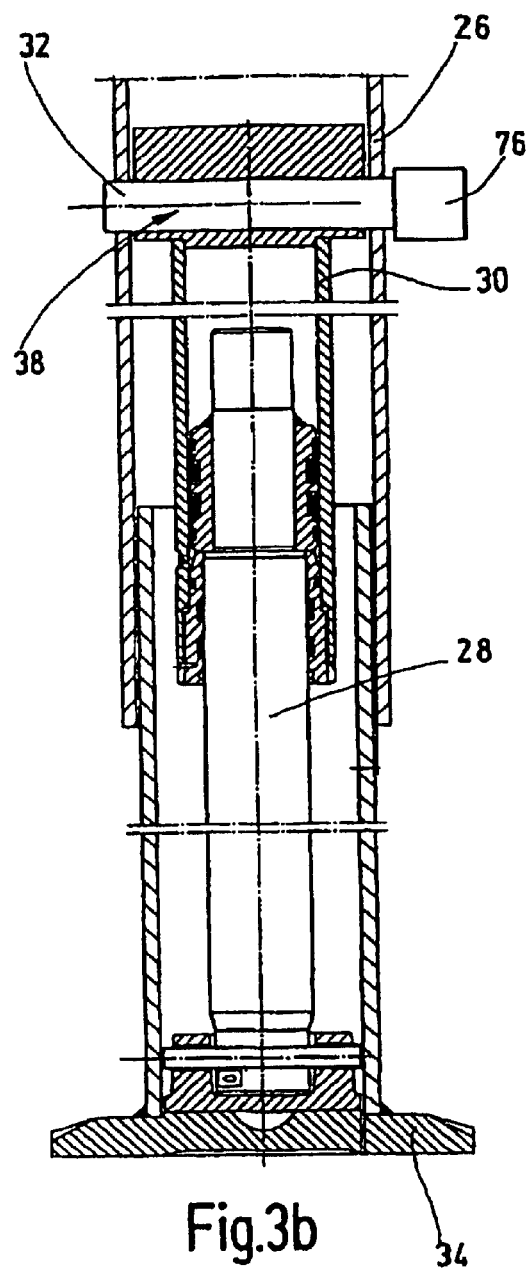
Fig.3a
Fig.3b

US 7,784,354 B2

MOVEABLE WORKING DEVICE WITH SUPPORTING EXTENSION ARMS

CROSS REFERENCE TO RELATED APPLICATION

This application is a national stage of PCT/EP2004/011523 filed Oct. 14, 2004 and based upon DE 103 49 234.8 filed on Oct. 20, 2003 under the International Convention.

BACKGROUND OF THE INVENTION

1. Field of the Invention

The invention concerns a mobile working device, in particular, a concrete pump, with a chassis, with two front and two rear supporting extension arms which can be extended from a travel position into at least one support position and with respectively one telescopic support leg which can be supported upon a foundation and with respectively one measuring member for determining the support load acting upon the support legs.

Mobile working devices of this type are provided with extendable support legs, which are intended to improve the stability of the work device at the site of employment. On the one hand, the support legs have the task of eliminating the spring travel and relieving the loads on the wheels. On the other hand, the supporting extension arms have the task of minimizing the danger of tipping, which occurs when a working extension member (boom) produces high overturn moments. The support legs of the supporting extension arms form the corners of a rectangle, of which the side lines describe an area, within which the center of gravity of the working device must lie, in order to ensure a stable stance. Since the projecting working extension member (boom) is rotateable, the center of gravity during rotation describes a complete circle, wherein the working zone of the working extension member must lie within the rectangle. Since the space requirement in a construction site is limited, frequently a complete extension is not possible. As a result the pivot range of the working extension member (boom) is limited.

2. Description of Related Art

In order to ensure safety against tipping, a monitoring device has already been described (the journal "Concrete" 6/96, pages 362, 364). There, the pressures existing in the four hydraulic actuated telescopes of the support legs are monitored. If the pressure drops in two support leg cylinders, then the boom movement and the concrete pump are switched off. This technique can also be used in the case that a machine, for reasons of restricted space, is not completely or fully supported. Research has shown that pressure measurement in the telescopic cylinders of the support legs is not a sufficient basis for a reliable monitoring of stability. This applies above all in the case when one of the telescopic cylinders is fully extended. Further, dynamic support effects cannot be detected by the monitoring systems.

In order to overcome these disadvantages, it has already been proposed (DE-A10110176), that in the foot part of each support leg a pair of force sensors is provided. For this, individual specially constructed support feet are necessary, of which the construction cost is quite high. Further, herein each force sensor is provided with its own electrical measurement circuit for providing a support load dependent measurement signal, wherein the monitoring device includes an evaluation unit, which in predetermined sampling times receives support load measurement values relating to the support feet and, for comparison, at least one predetermined stability determining threshold value. The evaluation unit includes a software routine for determining the second lowest support foot related support load measured value for each sample cycle and for the comparison thereof with a stability determining threshold value. A disadvantage herein is that the threshold value is a construction-dependent, dimensionally-contingent value, and that for the determination of the stability relevant load value a high measurement precision is necessary even in the case of low loads.

SUMMARY OF THE INVENTION

Beginning with this state of the art, it is the task of the present invention to develop a mobile working device with supporting extension arms in which the support load in the support legs can be determined with sufficient precision with simple means, in order to make possible a reliable monitoring of the support stability.

The solution of this task is proposed in accordance with a mobile work device as described in greater detail below.

The inventive solution is based upon the recognition, that in supporting extension arms in which the telescopic support legs have a telescope member rigidly connected to the extension arm, and a support leg casing coupled by means of a linkage bolt, the linkage bolt can be designed as the measuring element for determining the support load. A preferred embodiment of the invention envisions that a device for determining the elastic yield or bending of the linkage bolt occurring during the support process is used as the gauge for the support leg related support load. In this case the linkage bolt carries at least one tension or elongation measuring strip for determining the bolt bending.

A preferred embodiment of invention envisions that the linkage bolt includes at least one longitudinal groove running parallel to the axis for receiving the at least one tension measuring strip. Preferably the linkage bolts contain two longitudinal grooves open on opposite sides opposing each other relative to a bending plane for receiving respectively two tension measuring strips, wherein the contacts of the tension measuring strips are connected with each other in a measurement circuit preferably in the form of a bridge circuit. Further, the linkage bolt can functionally contain a central bore open on one side as well as a transverse bore running from the at least one longitudinal groove to the central bore for receiving a measurement cable.

According to a further alternative embodiment of the invention, a device is provided for determining the elastic sheer deformation occurring during the supporting process in the area of the bearing locations of the linkage bolt as the gauge for the support leg relevant support load. In this case the linkage bolt carries in the area of its bearing location at least one tension measuring strip for determining the sheer strain. The linkage bolt advantageously exhibits for this purpose in the area of the bearing locations at least one continuous through-hole in the support direction transverse to the bolt axis, in which a membrane connected unitarily with the bolt material is provided for receiving at least one tension measuring strip. Preferably the linkage exhibits in both bearing locations respectively one through hole with membrane, wherein the membrane is provided in the shear plane between and inner and an outer bearing of the support leg. The support bearings form a support or brace for the bolt in the support leg casing, while on the inner bearing the fixed telescope part is supported. On the broad side surfaces of the membrane facing away from each other usefully a pair of tension measuring strips running parallel to the shear plane are provided, wherein the tension measuring strips are preferably connected to each other in a measurement circuit in the form of a bridge circuit.

In both embodiments the measuring circuit is connected on the output side, via a signal amplifier, to a computer supported evaluation unit.

One advantageous or alternative embodiment of the invention envisions that the evaluation unit includes a software routine for determining a stance stability number from the quotient of the total value of the support load measurement values of all support legs and a partial sum of the support load measure values of the two instantaneously most highly loaded support legs, as well as an alarm routine for triggering an alarm condition in the case of exceeding a predetermined threshold value for the support safety value. The inventive device allows a real time monitoring of the support load in the area of the individual support legs in a narrow timeframe or interval, so that also dynamic effects and carrier effects during operation of the work device or boom can be taken into consideration during the monitoring.

In order to prevent tipping over of the work device during operation, multiple staggered alarm triggering threshold values for the support safety control are provided. Upon exceeding a first threshold value the operator is warned via an acoustic and/or optical signal. Upon exceeding a second threshold, lower than the first threshold, a releasable blocking of the load moving work movement is triggered. Finally, upon exceeding a third threshold value, lower than the second, a blocking of the load displacing work process occurs, which cannot be overridden.

BRIEF DESCRIPTION OF THE DRAWINGS

In the following the invention will be described in greater detail on the basis of the illustrative embodiment shown in schematic manner in the figures. There is shown in FIG. 1 a view of a mobile concrete pump parked on a street edge with support arms providing narrow support on the street-side;

FIG. 2 a side view of a supporting extension arm;

FIGS. 3 *a* & *b* a support leg with a measuring bolt designed as measuring element in the retracted and the extended position;

DETAILED DESCRIPTION OF THE INVENTION

Figure 1:
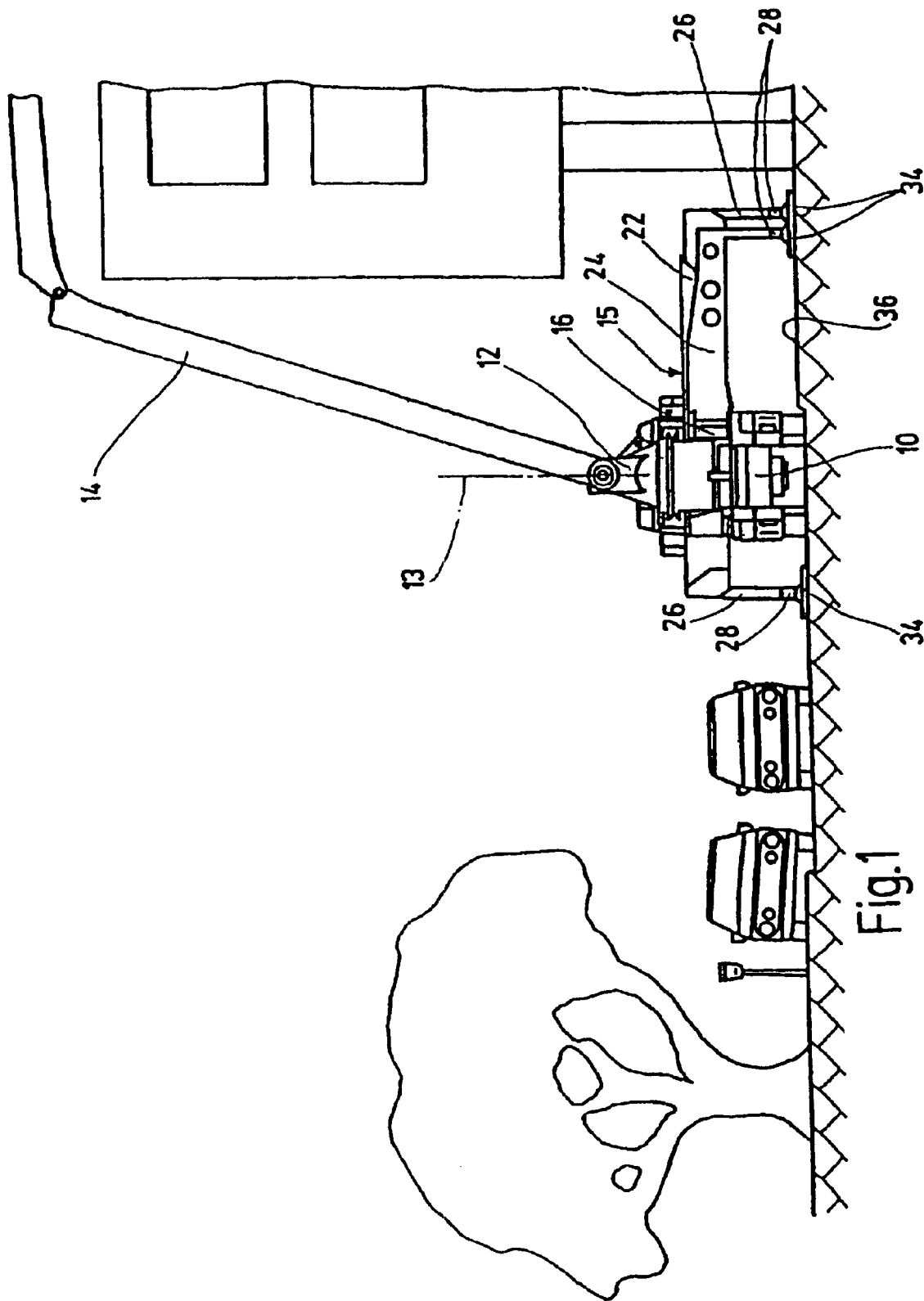

The mobile concrete pump shown in FIG. 1 is comprised essentially of a multi-axle vehicle chassis 10, a working extension member 14 in the form of a concrete distribution boom mounted to a mast block 12 near the front axle and rotateable about a vertical axis 13 relative to the vehicle chassis, and a support structure 15, which includes front and rear supporting extension arms 22, 24. The supporting extension arms 22, 24 include a downwards directed support leg casing 26, in which respectively one telescopic support leg 28 is secured with a telescopic element 30 fixed to the extension arm. The support leg 28 is supportable upon a foundation 36 with its foot plate 34. The front and rear supporting extensions arms 22, 24 are extendable via hydraulic means from a traveling position near the vehicle chassis to a supporting position. In the example shown in FIG. 1 a narrow support stance was selected for the street side. A narrow support stance, taking into consideration the narrow space available in construction site, leads necessarily to a reduction in scope of the rotation axis of the distribution boom 14.

The four support legs 28, supporting themselves upon the foundation, extend over a rectangular area, of which the sides respectively define the tip edge. For ensuring the support stability, the center of gravity of the system cannot extend outwards beyond the edges of the rectangle during movement of the distribution boom 14. The invention takes advantage of the recognition, that the position of the center of gravity within the tip rectangle can be monitored by measuring elements 38 within the support legs 28. Accordingly, in each support leg 28 a measuring element 38 is provided, which in the illustrative embodiments include respectively four tension measuring strips DMS1 through DMS4 with associated electrical measuring circuit 44 and operation amplifier 46. Each measuring circuit 44 provides via its amplifier 46 a support load measurement sampled in predetermined time cycles, which are processed in the evaluation unit 48 with connected onboard computer 50.

Figure 4A:
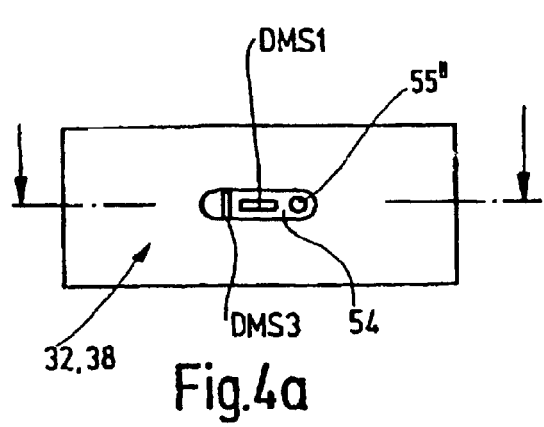
FIGS. 4 *a* & *b* a top view and a sectional representation of a linkage bolt as bending beam.
Figure 4B:
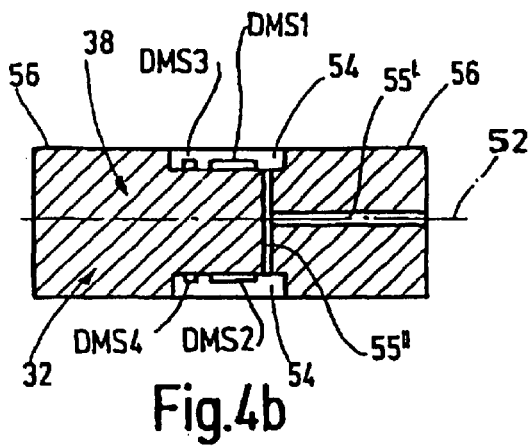
Figure 5A:
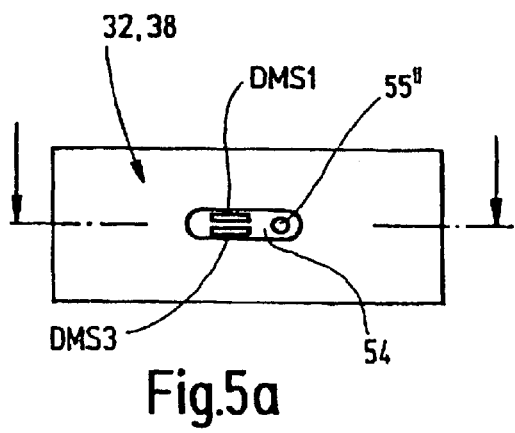
FIGS. 5 *a* & *b* a top view and a sectional representation of a further variant of the linkage bolt as bending beam.
Figure 5B:
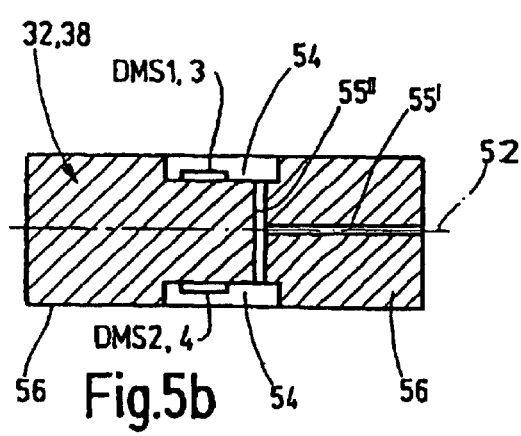

A unique feature of the invention is comprised therein, that the measuring elements for determining the support loads to which the support legs are subjected are constituted by the linkage bolts 32. In the case of the embodiment shown in FIGS. 4 and 5 the measuring element 38 includes a device for determining the elastic bending of the linkage bolt occurring during the supporting process as the value for the support load to which the support leg is subjected. For this purpose the linkage bolt 32 includes two tension measuring strips DMS1, DMS3 as well as DMS2, DMS4 lying opposite to each other with reference to a bending plane 52, longitudinal groves 54 open on opposite sides for receiving of respectively two tension measuring strips, wherein in the illustrative embodiment according to FIG. 5 the tension measuring strips are oriented parallel next to each other in the longitudinal direction of the linkage bolt 32 in the longitudinal grooves 54, while in the illustrative embodiment according to FIG. 4 in the longitudinal grooves respectively one tension measuring strip is provided oriented parallel and one in a transverse to the longitudinal direction of the linkage bolt 32.

Figure 6A:
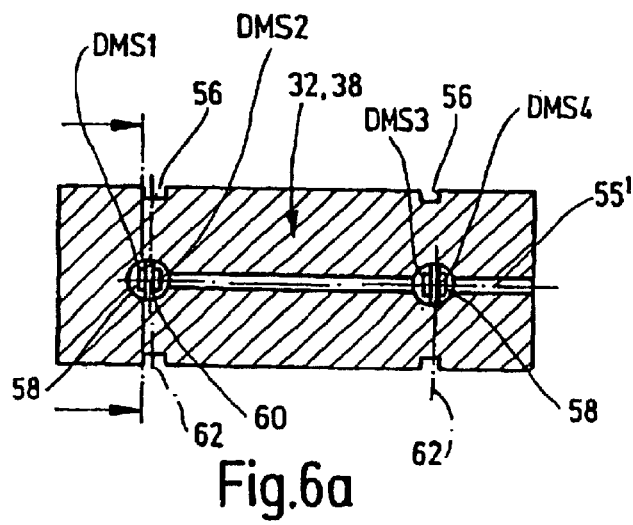
FIGS. 6 *a* & *b* a longitudinal section and a cross section of a linkage bolt as shear bolt.
Figure 6B:
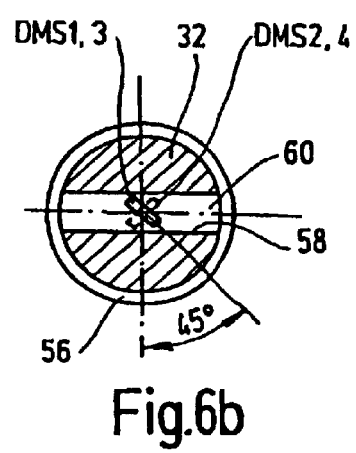
Figure 7:
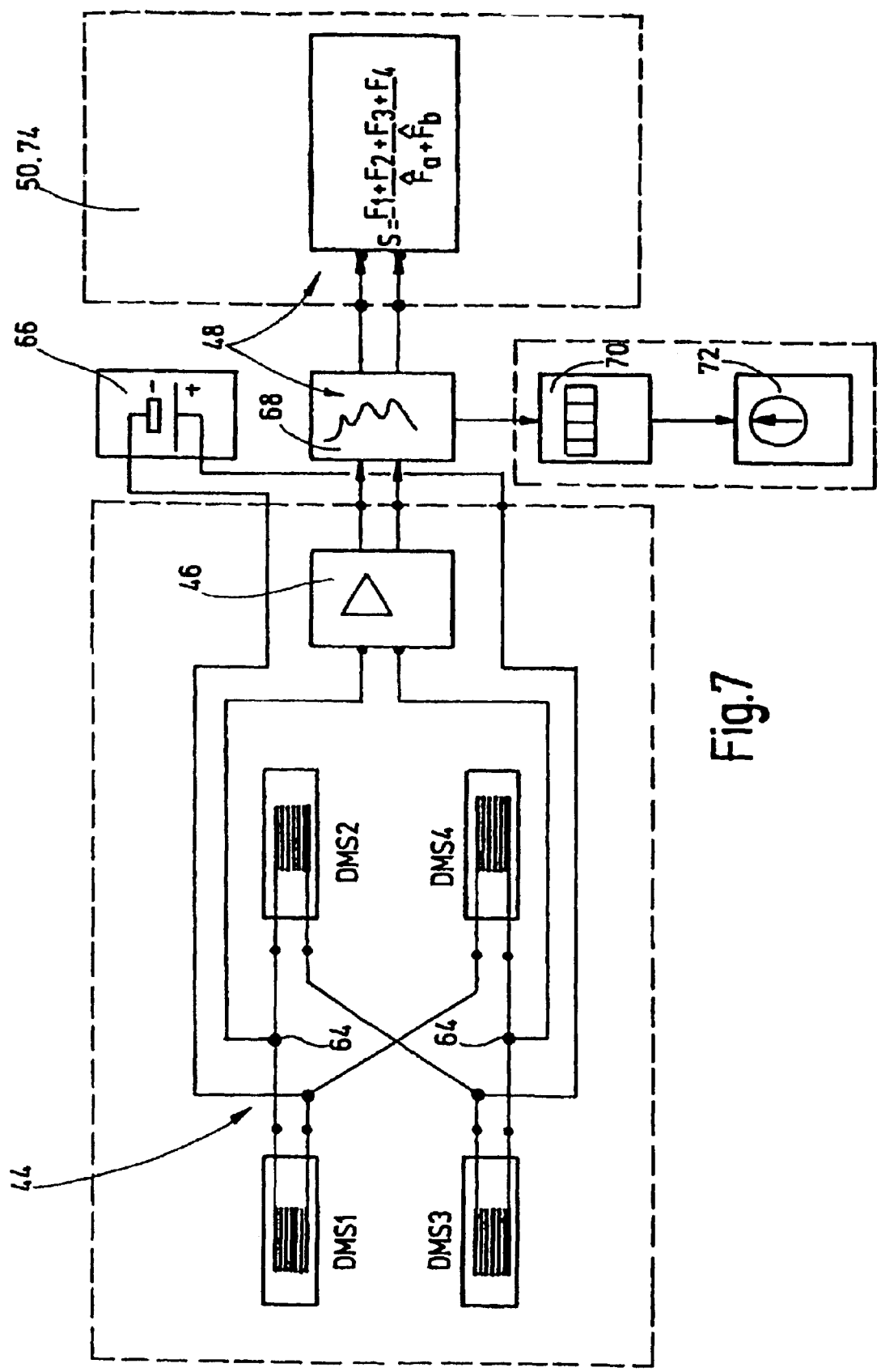
FIG. 7 a circuit diagram in schematic representation for respectively four tension strips in a bridge circuit with computer controlled evaluation electronic or unit.

In the illustrative embodiment shown in FIG. 6 the measurement element 38 includes a device for determining the elastic shear deformation occurring in the area of the bearing position 56 of the linkage bolt 32 for determining the value of the support load relative to the support legs in the supporting process. For this purpose the linkage bolts 38 include in the area of the bearing locations 56 respectively one through-hole 58, in which a membrane 60 joined unitarily with the bolt material is provided. The membrane is therein provided in the direction of the support load in the shear plane 62 between inner and outer bearing of the support leg 28. On the two broad side surfaces of the membrane facing away from each other, there is provided respectively one pair of tension measuring strips DMS1, DMS2 or as the case may be DMS2, DMS4 running diagonal to the support device, which pairwise cross at an angle of 90°.

The tension measuring strips DMS1 through DMS4 of the illustrative embodiment are connected with each other in a measuring circuitry 44 in the form of a bridge circuit, of which the diagonal contacts 64 are connected to the input of the operation amplifier 46. The current supply of the measuring circuit 44 occurs via a auxiliary or backup current source 66. The output signal of the measuring circuitry 44 is transmitted via a signal processing unit 68 to a digital or analog display 70, 72. Besides this, the output signals are supplied to an onboard computer 74 for further evaluation, in particular for a stability safety monitoring. The measurement circuitry 44 with the signal processing unit 68 are located respectively in a housing 76, which on one end of the associated linkage bolt 32 projects towards outside through the support leg casing 68. For this purpose the linkage bolt 32 contains a central bore 55' open on one side, as well as a transverse bore 55" running from the at least one longitudinal groove bolt 54 to the central bore for receiving a measurement cable guided in the housing bolt 76.

In the monitoring of stability the following considerations play an important role: The stability safety of a mobile concrete pump is produced from the weight distribution condition of a spatial force system. Forces of varying direction of action are therein, for example, time wise and locationally changing working forces, mass forces from acceleration and breaking processes, or wind loads as they may impinge with their force and velocity. The action of these influences is in equilibrium with the instantaneous magnitude of the support leg forces.

As described above, the support leg force can be determined by the measuring principle of a bending beam or via a measurement of shear force. The information regarding the instantaneous size of all four support leg forces are transmitted with an even sampling rate to the onboard computer 74, for example via cables or telemetrically. In the onboard computer 74 the received force values are processed in parallel. For this, first the sum of all support leg forces $F_i$ (i=1 through 4) is determined. For determining a stability value S this summed value is divided by the sum of the two instantaneously largest support leg forces $\hat{F}_a$ and $\hat{F}_b$:

$$S = \frac{F_1 + F_2 + F_3 + F_4}{\hat{F}_a + \hat{F}_b}$$

If the sum of the two highest support leg forces becomes equal to the sum of all support leg forces, then the machine is leaving the stable equilibrium, for example a three point support, into a instable equilibrium, and is no longer stable. The force-weight distribution corresponds to an instantaneous equilibrium about one of the above-described tip edges. By determining a machine independent stability value, for example S greater than or equal to 1.1, a constant remaining boundary stability can be achieved independent of machine type, of position of support legs, of wind load and other variable perimeters.

An important edge condition or boundary condition for a reliable supporting is the setting up of the work device with wheels of the vehicle chassis 10 lifted from the ground 36. For each work device the minimal weight for a sufficient stability is known by weighing. This value can be recorded in the onboard computer 74. After extending the support legs 28 prior to the lifting of the working boom 14 there can now, by measurement of the support leg forces, the actual machine weight be determined and compared with the recorded expected value. If the expected value is not reached, it follows that the wheels of the vehicle chassis 10 are still on the ground, so that the stability is not sufficiently ensured. A releasing of the working boom 14 is only then allowed by the machine controller when the measured machine weight reaches or exceeds a predetermined intended value.

In order to prevent a tipping over of the machine in operation, three threshold values $S_1$, $S_2$, $S_3$ are differentiated. Upon exceeding the first threshold value $S_1$ (for example $S_1$=1.25) the machine operator is informed thereof via an optical or acoustic signal, that the working boom 14 upon further movement is nearing the stability limit. If the machine operator continues further into the stability danger area, then upon reaching the second threshold value $S_2$ (for example $S_2$=1.1) the drives or actuators of the work boom 14 are turned off. The working boom 14 can again be released upon releasing a blocking function, for example using a remote control. Since a further movement of the working boom 14 out of the critical position must remain available by operating various drive aggregates of the working boom 14, a coupling of the stability monitoring with acoustic/optical signals is necessary. Also possible herein is the design of a control function, in which certain drive aggregates of the working boom 14 either remain blocked or only have a limited degree of freedom. For this, various strategies are necessary depending upon the type of activation of the working boom 14, for example by the type of folding of a concrete distribution boom.

In the worst case the machine operator, however, continues into the unstable area. Upon reaching the boundary value $S_3$ (for example $S_3$=1.05) corresponding to the loss of stability, then the drive of the supporting extension arms 14 must be completely blocked. A release is only possible when a degree of stability corresponding to a higher threshold value $S_2$ is returned to by supplemental ballasting of the substructure, for example by hanging of drop weights onto the support legs 28, filling up the tank of a support leg 28 in the form of a tank, trimming the work device by pumping the tank content from one to another support leg 28.

In summary the following can be concluded: The invention relates to a moveable working device, particularly an auto concrete pump, comprising an undercarriage 10 provided with two front and two rear supporting extension arms 22, 24 which can be extended from a travel position into at least one support position, which can be supported on a foundation 36 and which are respectively provided with a supporting leg 28, also provided with a respective measuring member 38 for determining the support load acting upon the supporting legs 28. If the telescopic supporting legs 28, with the telescopic member 30 fixed to the extension arm are coupled to a support leg casing by means of a coupling bolt 32, it is possible to configure the coupling bolt as a measuring member 38 in order to determine the support load, using particularly simple means. The measuring members can be incorporated into a stability monitoring device comprising a computer-assisted evaluation electronics system 68, 74. A software routine is provided for stability control in order to determine a stability figure (S) which is determined on the basis of the quotients of the overall sum of the support load measurement values of all supporting legs 28 and a partial sum of the support load measurement values of the two supporting legs 28 which are momentarily subjected to a support load. An alarm routine is also provided in order to trigger an alarm state if said values fall below a given stability threshold value (S1, S2, S3).

The invention claimed is:
1. A mobile work device, comprising:
a vehicle chassis (10),
two front and two rear supporting extension arms (22, 24) extendable from a travel position to at least one support position and supportable upon a foundation (36) with respectively one telescopic support leg (28), and
respectively one measuring member (38) for determining the support load on each of the support legs (28), wherein the telescopic support legs (28) have a telescope member (30) rigidly connected to the extension arm, and a support leg casing (26) coupled by means of a linkage bolt (32), wherein the linkage bolt (32) functions as the measuring member (38) for determining the support load in that a device for determining the elastic bending of the linkage bolt (32) occurring during the supporting process is used as the gauge for determining the support load specific to the support leg, wherein the linkage bolt (32) includes two longitudinal grooves (54) lying opposite to each other with reference to a bending plane (52), open towards oppositely facing sides for receiving of respectively two tension measuring strips(DMS1, DMS3 or, as the case may be, DMS2 and DMS4), and that the contacts of the tension measuring strips are connected with each other in a measurement circuit (44) as a bridge circuit.

2. A working device as in claim 1, wherein said working device is a mobile concrete pump.

3. A working device according to claim 1, wherein the linkage bolt (32) exhibits a one-side open central bore (55') as well as a transverse bore (55") running from the at least one longitudinal groove (54) to the central bore for receiving a measurement cable.

4. A working device, including:
a vehicle chassis (10),
two front and two rear supporting extension arms (22, 24) extendable from a travel position to at least one support position and supportable upon a foundation (36) with respectively one telescopic support leg (28), and
respectively one measuring member (38) for determining the support load on the support legs (28),
wherein the telescopic support legs (28) have a telescope member (30) rigidly connected to the extension arm, and a support leg casing (26) coupled by means of a linkage bolt (32),
wherein the linkage bolt (32) functions as the measuring member (38) for determining the support load via a device for determining the elastic shear strain occurring during the supporting process in the area of the bearing locations (56) of the linkage bolt (32) as value for the support leg relevant support load, wherein the linkage bolt (32) in the area of the bearing locations (56) includes at least one through-hole (58) oriented in the direction of supporting, in which a membrane (56) is provided connected with the bolt material, which carries at least one tension measuring strip (DMS 1 through DMS4).

5. A working device as in claim 4, wherein said working device is a mobile concrete pump.

6. A working device according to claim 4, wherein the membrane is connected unitarily with the bolt material.

7. A working device according to claim 4, wherein the linkage bolt (32) on both bearing locations (56) respectively exhibits one through hole (58) with membrane (56), wherein the membrane is provided in the shear plane (62) between an inner and an outer bearing of the support leg (28).

8. A working device according to claim 7, wherein on each of the two broadside surfaces of the membrane (60) facing away from each other respectively one parallel to the shear plane (62) running tension measuring strip (DMS 1 through DMS4) is provided, and that the tension measuring strips are connected with each other in a measuring circuit (44), preferably in the form of a bridge circuit (12)

9. A working device according to claim 4, wherein the tension measuring strips provided on the two broad surfaces of the membrane (60) are oriented diagonal to the direction of support.

10. A working device according to claim 9, wherein the two tension measuring strips (DMS1 through DMS4) provided on the two broad surfaces of the membrane cross each other pair-wise at an angle of from 45° to 90°.

11. A working device according to claim 4, wherein the measurement circuit (44) is connected with a computer supported evaluation unit (48, 50) via a signal amplifier (46) in the form of an operation amplifier.

12. A working device according claim 4, wherein the linkage bolt (32) carries on its part projecting beyond the support leg casing a housing part (76) for receiving a measuring and evaluation unit (44, 68).

13. A working device according to 11, wherein the evaluation unit (48, 50) includes a software routine for determining a stability safety value (S) from the quotients of the total sum of the support load measured values of all support legs and a partial sum of the support load measured value of the two momentarily most highly loaded support legs, as well as an alarm routine for triggering an alarm condition upon exceeding a predetermined threshold value for the stability safety value.

14. A working device, including:
a vehicle chassis (10),
two forward and two rear supporting extension arms (22, 24) pivotable from a travel position to at least one supporting position and respectively supportable upon the foundation (36) with one telescopic support leg (28) supporting the extension arm (22, 24),
a measuring element (38) for determining the support load in the support legs (28), and
a device for monitoring the degree of stability, which includes an evaluation unit (68, 74), which receives support leg relevant support load measurement values at predetermined sample intervals, characterized by a software routine for determining a support safety value (S) from the quotients of the total sum of the support load measured values of all support legs (28) and a partial sum of the support load measured values of the two momentarily most highly loaded support legs (28), as well as an alarm routine for triggering an alarm condition upon dropping below a predetermined threshold value for the support degree of safety value.

15. A working device according to claim 14, wherein said working device is a mobile concrete pump.

16. A working device according to claim 14, wherein the alarm triggering threshold value is between 1.05 and 1.25.

17. A working device according to claim 14, wherein multiple staged or stepped threshold values ($S_1$, $S_2$, $S_3$) trigger alarms for stability safety.

18. A working device according to claim 17, wherein upon dropping below a first threshold value ($S_i$) an acoustic and/or optical signal can be triggered.

19. A working device according to claim 18, wherein upon dropping below of a second threshold value ($S_2$) of a lower value than the first, a releasable blocking of a load displacing work process can be initiated.

20. A working device according to claim 19, wherein upon dropping below a third threshold value ($S_3$) lower in value than the second, a non-override blocking of the load displacement working process can be initiated.

* * * * *